US010477406B2

(12) United States Patent
Cutcher et al.

(10) Patent No.: US 10,477,406 B2
(45) Date of Patent: Nov. 12, 2019

(54) DEVICE, SYSTEM AND METHOD FOR DYNAMIC CHANNEL ASSIGNMENT

(71) Applicant: MOTOROLA SOLUTIONS, INC., Chicago, IL (US)

(72) Inventors: Jeffrey L. Cutcher, Davie, FL (US); Rolando Hernandez, Miami, FL (US); Rajesh Baliram Singh, Davie, FL (US); Daniel L. Cronin, Hollywood, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 4 days.

(21) Appl. No.: 15/710,505

(22) Filed: Sep. 20, 2017

(65) Prior Publication Data
US 2019/0090137 A1    Mar. 21, 2019

(51) Int. Cl.
*H04W 16/10* (2009.01)
*H04W 72/04* (2009.01)
*H04W 72/02* (2009.01)
*H04B 17/318* (2015.01)
*H04W 16/14* (2009.01)
*H04W 4/10* (2009.01)
*H04W 24/10* (2009.01)

(52) U.S. Cl.
CPC .......... *H04W 16/10* (2013.01); *H04B 17/318* (2015.01); *H04W 4/10* (2013.01); *H04W 16/14* (2013.01); *H04W 72/02* (2013.01); *H04W 72/0453* (2013.01); *H04W 24/10* (2013.01)

(58) Field of Classification Search
None
See application file for complete search history.

(56) References Cited

U.S. PATENT DOCUMENTS

| 5,844,522 | A | * | 12/1998 | Sheffer | G01S 5/04 342/457 |
| 5,862,487 | A | | 1/1999 | Fujii et al. | |
| 6,018,663 | A | | 1/2000 | Karlsson et al. | |
| 6,374,098 | B1 | * | 4/2002 | Raith | H04W 4/90 455/404.2 |
| 7,203,471 | B2 | | 4/2007 | Cutcher et al. | |
| 8,116,687 | B2 | | 2/2012 | Patel et al. | |
| 2005/0070320 | A1 | * | 3/2005 | Dent | H04W 72/005 455/516 |

(Continued)

FOREIGN PATENT DOCUMENTS

EP    1251704 B1    11/2009

OTHER PUBLICATIONS

UKIPO, Combined Search and Examination Report under Sections 17 and 18(3), dated Feb. 19, 2019, re UK Patent Application No. GB1814025.1.

*Primary Examiner* — Rafael Pérez-Gutiérrez
*Assistant Examiner* — Frank E Donado
(74) *Attorney, Agent, or Firm* — Perry + Currier, Inc.

(57) ABSTRACT

A device, system and method for dynamic channel assignment is provided. A communication device assigns one or more channels for use by one or more of a plurality of mobile radios in a geographic region around an incident location using one or more lists indicative of unusable channels in the geographic region, the one or more lists received by the plurality of mobile radios, the one or more channels assigned for use excluding the unusable channels in the geographic region.

15 Claims, 12 Drawing Sheets

(56) References Cited

U.S. PATENT DOCUMENTS

| | | | |
|---|---|---|---|
| 2006/0089099 A1* | 4/2006 | Buchwald | H04W 74/00 455/41.2 |
| 2009/0047971 A1 | 2/2009 | Fu | |
| 2011/0201372 A1 | 8/2011 | Luo et al. | |
| 2013/0023214 A1 | 1/2013 | Wang et al. | |
| 2014/0080532 A1 | 3/2014 | Oh | |
| 2014/0148118 A1* | 5/2014 | Lorenz | H04W 52/0209 455/404.1 |
| 2016/0088484 A1* | 3/2016 | Yang | H04W 16/14 370/252 |
| 2016/0142895 A1* | 5/2016 | Bennett | H04W 4/90 455/404.1 |
| 2016/0183310 A1* | 6/2016 | Negahban | H04W 4/90 455/404.2 |
| 2017/0188206 A1* | 6/2017 | Schmitt | H04W 4/90 |
| 2017/0188371 A1* | 6/2017 | Kim | H04W 24/10 |
| 2017/0295115 A1* | 10/2017 | Mottur | H04L 51/20 |
| 2017/0325210 A1* | 11/2017 | Green | H04W 72/0453 |

\* cited by examiner

DEVICE, SYSTEM AND METHOD FOR DYNAMIC CHANNEL ASSIGNMENT

BACKGROUND OF THE INVENTION

When a dispatch center and/or a base station receives an incident report, and the like, that includes a location of a crime in-progress, the dispatch center may dispatch police officers, and the like, to that location. Within a geographic region of that location, it is important that mobile radios used by the police officers have good reception.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
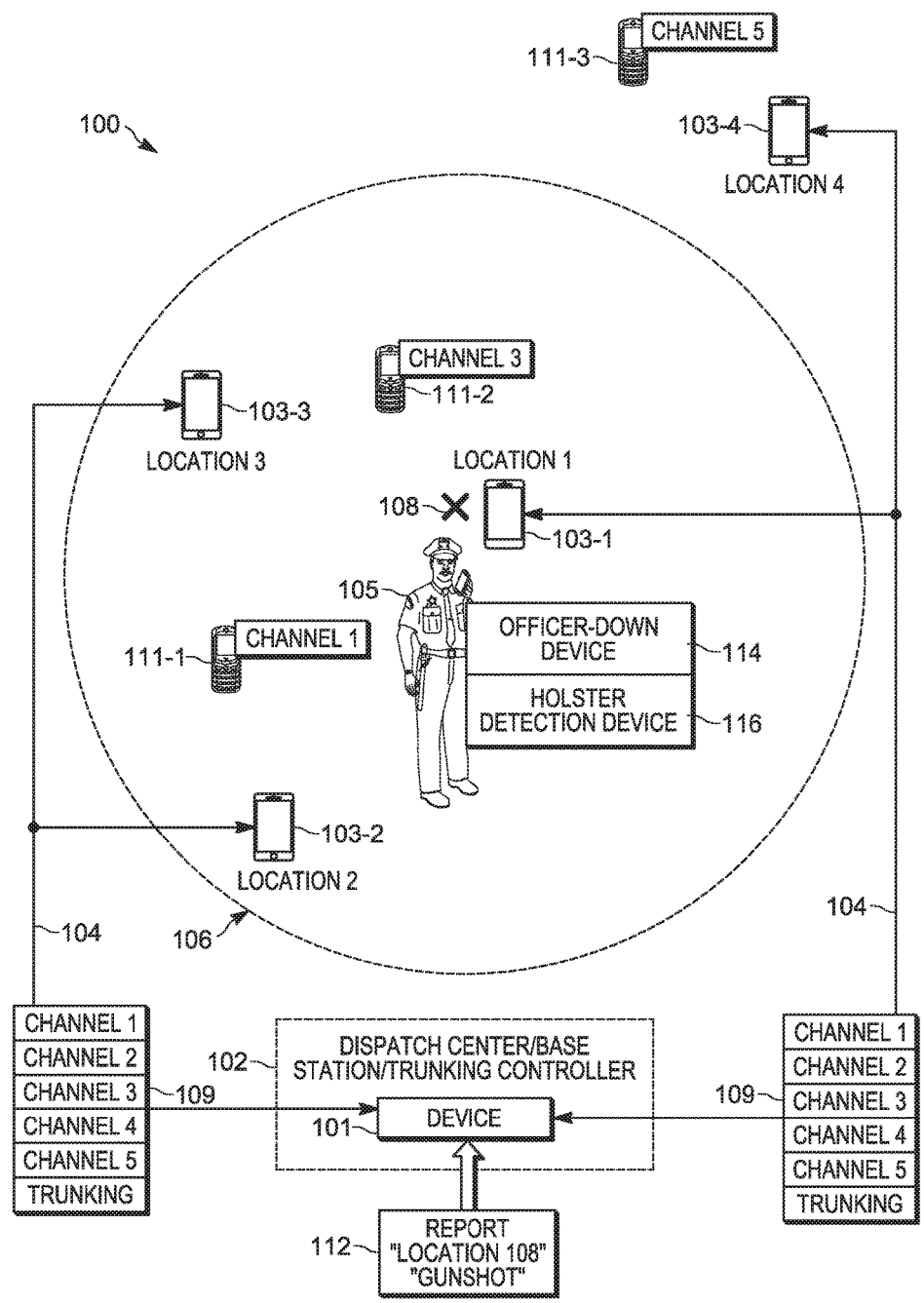
FIG. 1 depicts a system that includes a communication device for electronically dispatching responders in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When a dispatch center and/or a base station receives an incident report, and the like, that includes a location of a crime in-progress, the dispatch center may dispatch police officers, and the like, to that location. Within a geographic region of that location, it is important that mobile radios used by the police officers have good reception. However, some channels used by the mobile radios may experience strong interference, for example when analog trunking is used and, in some instances the mobile radios may be blocked from crucial emergency radio communications. In some instances, such interference may be due to foreign radio devices using frequencies that are approved for use in a foreign jurisdiction, but not in the jurisdiction they are visiting, where such frequencies may be restricted for use by public safety systems. Such interference may be due to co-channel interference and/or intermodulation interference.

An aspect of the specification provides a communication device comprising: a communications interface configured to communicate with a plurality of mobile radios using predefined channels; and a controller configured to: receive, via the communications interface, an incident location; select at least one assigned mobile radio, from the plurality of mobile radios, to respond to the incident location; receive, from at least one of the plurality of mobile radios, via the communications interface, one or more lists indicative of unusable channels at respective locations, the unusable channels selected from the predefined channels; select at least one assigned channel from the predefined channels excluding the unusable channels in a geographic region around the incident location as determined from the one or more lists; and control the at least one assigned mobile radio to communicate using the at least one assigned channel in the geographic region.

Another aspect of the specification provides a method comprising: receiving, at a controller of a communication device, via a communications interface of the communication device, an incident location, the communications interface configured to communicate with a plurality of mobile radios using predefined channels; selecting, at the controller, at least one assigned mobile radio, from the plurality of mobile radios, to respond to the incident location; receiving, at the controller, from at least one of the plurality of mobile radios, via the communications interface, one or more lists indicative of unusable channels at respective locations, the unusable channels selected from the predefined channels; selecting, at the controller, at least one assigned channel from the predefined channels excluding the unusable channels in a geographic region around the incident location as determined from the one or more lists; and controlling, using the controller, the at least one assigned mobile radio to communicate using the at least one assigned channel in the geographic region.

Another aspect of the specification provides a communication system, comprising: a plurality of mobile radios; and a base station, the base station assigning one or more channels for use by one or more of the plurality of mobile radios in a geographic region around an incident location using one or more lists indicative of unusable channels in the geographic region, the one or more lists received by the plurality of mobile radios, the one or more channels assigned for use excluding the unusable channels in the geographic region.

FIG. 1 is a block diagram of a system 100 that includes a communication device 101, such as a computer aided dispatch device located at a dispatch center 102 (which, as depicted, includes a base station and/or a trunking controller), in communication with a plurality of mobile radios 103-1, 103-2, 103-3, 103-4 associated with respective responders, using one or more communication links 104. One responder 105 is depicted at the mobile radio 103-1 as an example responder, the responder 105 including, but not limited to, a police officer. The at least two mobile radios 103-1, 103-2, 103-3, 103-4 will be interchangeably referred to hereafter, collectively, as mobile radios 103, and generically as a mobile radio 103.

As further depicted in FIG. 1, a geographic location 106 has been determined around a location 108 where an incident, such as a crime, has occurred, the location 108, interchangeably referred to hereafter as an incident location 108. The geographic region 106 is depicted schematically as a circle around the location 108, however the geographic region 106 may be any shape, including defined by city blocks. In particular, a size of the geographic region 106 may be determined by the device 101 based on an incident type (e.g. a type of incident) at the location 108. Hence, for example, the geographic region 106 includes a perimeter around the location 108. The geographic region 106 will be interchangeably referred to hereafter as the region 106.

As depicted, mobile radios 103-1, 103-2, 103-3 are at locations inside the region 106 (respectively "Location 1", "Location 2", "Location 3"), while the mobile radio 103-4 is at a location outside the geographic region 106 ("Location 4").

As described in more detail below, each of the mobile radios 103 are configured to communicate with the device 101, and/or with each other, via the links 104, and using predefined channels 109 over the link 104. For example, as depicted, the predefined channels include five channels (labeled "Channel 1", "Channel 2", "Channel 3", "Channel 4", "Channel 5") and an optional trunking channel (labelled "Trunking"). When the predefined channels 109 including the trunking channel, communication using the predefined channels 109 may be controlled using the trunking channel using, for example, trunking and/or analog trunking.

Example communication channels 109 over which the mobile radios 103 and the device 101 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

Indeed, in the system 100, the mobile radios 103 may be organized into talkgroups which share assigned channels 109. For example, when a subset of the mobile radios 103 are in a given talkgroup, all mobile radios 103 in the talkgroup will use a channel 109 assigned to the given talkgroup, for example by the device 101 (e.g. assuming that the device 101 includes a trunking controller). Indeed, the system 100 may include a plurality of talkgroups and each of the mobile radios 103 may belong to one or more of the plurality of talkgroups.

In particular, wireless communications over each of the channels 109 may be over respective frequencies and/or wavelengths which are dedicated (e.g. in a jurisdiction associated with the system 100) for use by public safety agencies, such as a police organization, and the like.

However, as also depicted in FIG. 1, located within the system 100 are a plurality of communication devices 111-1, 111-2, 111-3 (interchangeably referred to hereafter, collectively, as the devices 111 and, generically, as a device 111) which interfere with one or more of the channels 109 and/or use channels and/or frequencies and/or wavelengths which interfere with one or more of the channels 109. Such interference may include, but is not limited to, co-channel interference, intermodulation interference, and the like. For example, as depicted the devices 111-1, 111-2, 111-3 are respectively interfering with channels 1, 3 and 5.

Such devices 111 may comprise devices from a jurisdiction not associated with the system 100. For example, such devices 111 may have been transported to the system 100 by tourists, travelers and the like. Within a "home" jurisdiction of such devices 111, channels and/or frequencies and/or wavelengths which interfere with one or more of the channels 109 may be approved for use by the devices 111, whereas devices (such as commercial mobile devices) whose home jurisdiction is the jurisdiction of the system 100 are not approved to use such channels 109, and/or frequencies and/or wavelengths that interfere with the channels 109.

However, while interference with the channels 109 is presently described with respect to interference by the devices 111, other types of interference are within the scope of the present specification including, but not limited to, interference due to weather, geographical features, buildings, and the like.

Indeed, regardless of a type of interference, a portion of the channels 109 may be unusable at a given location within the system 100.

Furthermore, whether or not a channel 109 is unusable may further depend on a time of day and/or a date, for example due to patterns of the devices 111 being used at given times of day, weather patterns, and the like.

Regardless, any of the channels 109 being unusable may cause problems when a mobile radio 103 is responding to an incident at the location 108, and attempting to communicate using the channels 109.

Hence, each of the mobile radios 103 are furthermore configured to be controlled to communicate on channels assigned to the mobile radios 103 by the device 101, assigned channels selected from the predefined channels 109, excluding channels 109 which are unusable. Furthermore, each of the mobile radios 103 is generally configured to: scan the predefined channels 109 to determine which of the predefined channels 109 are unusable at locations where the scan occurred; and transmit lists indicative of unusable channels to the device 101.

Hence, each of the mobile radio 103 may be configured to determine their respective locations, for example via a location determining device and report their respective location to the device 101 with the lists indicative of unusable channels, via the links 104, for example periodically and/or upon request from the device 101 and/or when a trigger event occurs at a mobile radio 103. Alternatively, and/or in addition to, the device 101 may be configured to identify the locations of each of the mobile radios 103 using triangulation techniques and the like, for example by querying cell phone towers, and the like.

Furthermore, assignment of channels 109 is generally based on the device 101 determining that an incident has occurred at the location 108 to which the mobile radios 103 are assigned to respond.

For example, as depicted, the device 101 is receiving a report 112 of the location 108 (e.g. "Location 108") of an incident and (optionally) of a type of the incident (e.g. "Gunshot"), for example from a 911 call center (not depicted) and the like, and/or one of the mobile radios 103. The "Location 108" of the incident received in the report 112 may include a street address, Global Positioning System (GPS) coordinates, Globalnaya Navigazionnaya Sputnikovaya Sistema (GLONASS) coordinates, and the like. The incident type "Gunshot", when present, may be in form of text, an incident code, and the like.

The report 112 may include an incident report, including, but not limited to, a law enforcement report. However, the report 112 may be transmitted by one or more of the mobile radios 103 for example when a trigger event occurs at a mobile radio 103. For example, such trigger events may include, but are not limited to, an "officer-down" detection, an unholstered gun detection, and the like, assuming that a responder 105 is equipped with one or more of (as depicted): an officer-down detection device 114 (e.g. configured to detect the responder 105 has fallen down, for example due to being shot and/or injured); a holster detection device 116 (e.g. configured to detect when a gun is unholstered), and the like, such devices 114, 116 in communication with a respective mobile radio 103. The responder 105 may be equipped with other types of devices, including, but not limited to, a heart rate monitor; in these implementations, a trigger event may include a heart rate being above or below a respective threshold value.

In other words, a mobile radio 103 may be configured to receive an indication of an officer down and/or an unholstered gun from one or more of the devices 114, 116 (and/or other types of indications from other types of devices used by the responder 105) and, in response, transmit a report 112 to the device 101 indicating a type of incident (e.g. "Officer Down" and/or "Unholstered Gun" and/or a heart rate meeting a given condition), and a respective location of the mobile radio 103. Hence, in these implementations, the location 108 received in the report 112 may be coincident with a mobile radio 103 from which the report 112 is received (e.g. such from the mobile radio 103-1, depicted at the location 108).

As depicted, each the mobile radios 103 comprise a mobile communication device; however, one or more of the mobile radios 103 may include other types of physical platforms, including, but not limited to, a vehicle radio, a portable radio (e.g. with a remote speaker microphone (RSM)), and the like. However, any type of physical platform for the mobile radios 103 is within the scope of the present specification.

While four mobile radios 103 are depicted, a number of the mobile radios 103 may include as few as one mobile radios 103, or more than four mobile radios 103, depending, for example, on a number of mobile radios 103 and/or responders and/or police officers and/or emergency responders being managed within the system 100 and/or by the device 101.

Furthermore, the system 100 may include other mobile radios 103 that are outside the depicted region 106 (e.g. the mobile radio 103-4), however, the depicted geographic region 106 may represent a perimeter around the location 108, as determined by the device 101 when the report 112 is received, and the device 101 may be configured to restrict channels over which mobile radios 103 communicate inside the region 106.

Furthermore, while example embodiments are described herein with respect to the mobile radios 103 associated with responders who are police officers (e.g. the responder 105) being dispatched to respond to a crime at the location 108, other types of responders may be dispatched (e.g. via the mobile radios 103) to the location 108 including, but not limited to, first responders, firefighters, paramedics, and the like.

Furthermore, other types of incidents may occur at the location 108 to which responders may be dispatched, including, but not limited to, fires, medical emergencies, and the like.

Indeed, in yet further embodiments, the responders dispatched to the location (e.g. via the mobile radios 103) may not be first responders, but employees and/or users associated with a commercial entity and the like (e.g. power company employees, telephone company employees), and the incident at the location 108 may not be a first responder incident, but an incident associated with the commercial entity, such as a power outage, a communication outage and the like.

In some embodiments, a portion of the mobile radios 103, regardless of their physical configuration, may generally comprise a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, mobile camera devices and the like. Furthermore, one or more of the mobile radios 103, may include vehicles, and the like (for example police cars, emergency service vehicles and the like), which in turn include a mobile device, such as a radio, an emergency radio, and the like.

Indeed, in some embodiments, one or more of the mobile radios 103 are specifically adapted for emergency service radio functionality, and the like, used by emergency responders and/or emergency responders, including, but not limited to, police service responders, fire service responders, emergency medical service responders, and the like. In some of these embodiments, the mobile radios 103 further includes other types of hardware for emergency service radio functionality, including, but not limited to, push-to-talk ("PTT") functionality.

In specific embodiments, the device 101 comprises a server and/or components of a computer aided dispatch (CAD) center (e.g. the dispatch center 102) and/or a command center, including, but not limited to, an emergency dispatch center used to communicate with first responders and/or emergency responders, and hence the device 101 may comprise a server device and/or a communication device configured to dispatch the mobile radios 103 to the location 108. The device 101 may further include a base station and/or a trunking controller, assuming that communications between the mobile radios 103 are controlled via the trunking channel.

However, the device 101 may alternatively comprise one of the mobile radios 103, and/or any device configured to generate dispatch commands that include respective routes to a location. In implementations where a mobile radio 103 comprises a vehicle, such a mobile radio 103 may be a component of a vehicle area network (VAN). Similarly, a mobile radio 103 may be a component of a personal area network (PAN).

Figure 2:
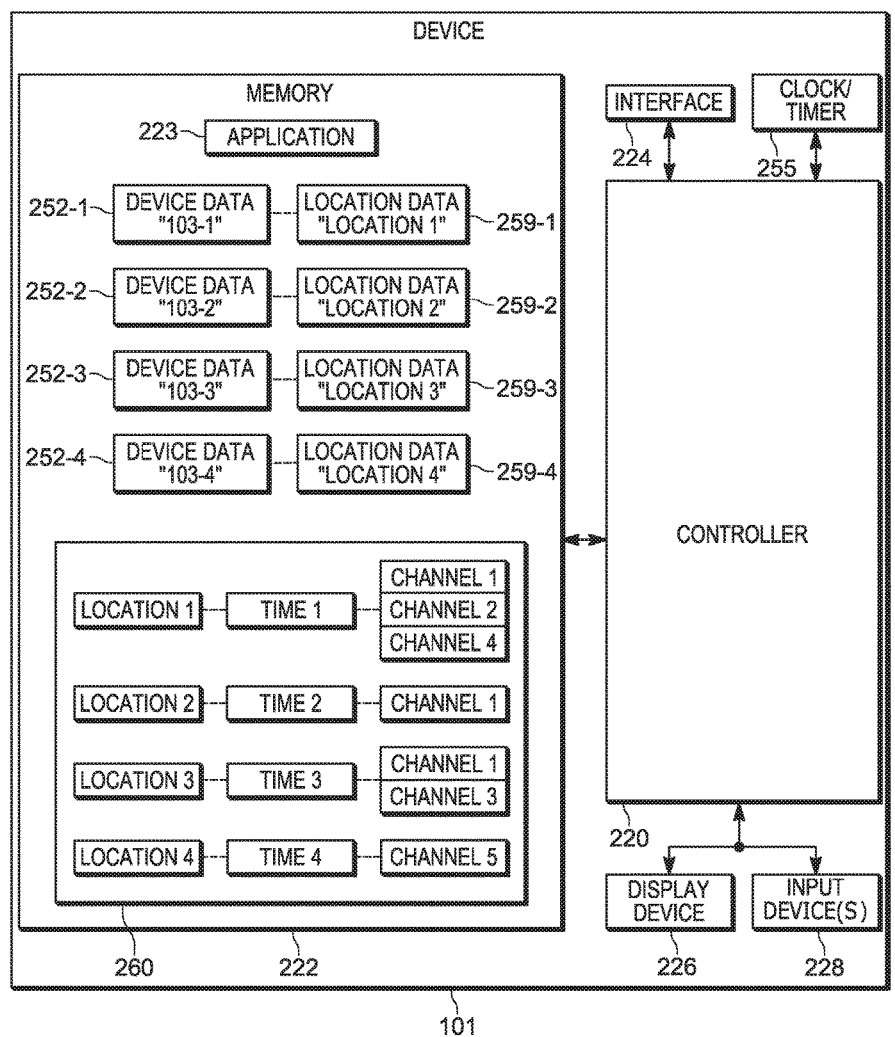
FIG. 2 depicts a block diagram of a communication device for electronically dispatching responders in accordance with some embodiments.

Attention is next directed to FIG. 2 which depicts a block diagram of the device 101. The device 101 comprises: a controller 220, a memory 222, storing an application 223, and a communication interface 224, interchangeably referred to hereafter as the interface 224, and optionally a display device 226 and at least one input device 228. The controller 220 is generally configured for communication with the mobile radios 103, using the communication interface 224.

As depicted, the device 101 further includes a clock 255 and/or timer, which may be configured to determine a current time and/or date, and may be further used by the controller 220 to determine when a given period of time has elapsed. While the clock 255 is depicted as separate from the controller 220, the clock 255 may alternatively be integral with the controller 220 (e.g. as clock and/or timer of processor, and the like).

The controller 220 includes one or more logic circuits, one or more processors, one or more microprocessors, one or more ASIC (application-specific integrated circuits) and one or more FPGA (field-programmable gate arrays). In some embodiments, the controller 220 and/or the device 101 is not a generic controller and/or a generic device, but a device specifically configured to implement channel assignment functionality. For example, in some embodiments, the device 101 and/or the controller 220 specifically comprises a computer executable engine configured to implement specific channel assignment functionality.

The memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). Furthermore, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

In particular, the memory 222 of FIG. 1 stores instructions corresponding to the application 223 that, when executed by the controller 220, enables the controller 220 to: receive, via the communications interface 224, an incident location 108; select at least one assigned mobile radio 103, from the plurality of mobile radios 103, to respond to the incident location 108; receive, from at least one of the plurality of mobile radios 103, via the communications interface 224, one or more lists indicative of unusable channels 109 at respective locations, the unusable channels 109 selected from the predefined channels 109; select at least one assigned channel 109 from the predefined channels 109 excluding the unusable channels 109 in a geographic region 106 around the incident location 108 as determined from the one or more lists; and control the at least one assigned mobile radio 103 to communicate using the at least one assigned channel 109 in the geographic region 106.

As depicted, the memory 222 further stores device data 252-1, 252-2, 252-3, 252-4 for each of the mobile radios 103 (interchangeably referred to, hereafter, collectively and/or generically as the device data 252) which may include, but is not limited to a respective identifier (e.g. "103-1", "103-2", "103-3", "103-4") of each of the mobile radios 103. The device data 252 may be stored in respective association (as indicated by the broken lines therebetween) with location data 259-1, 259-2, 259-3, 259-4 (interchangeably referred to, hereafter, collectively and/or generically as the location data 259) that includes an indication (e.g. "Location 1", "Location 2", "Location 3", "Location 4") of the respective locations of each of the mobile radios 103, for example as received from each of the mobile radios 103. The indications of the respective locations may include, but is not limited to, a street address, GPS coordinates, GLONASS coordinates, and the like. While not depicted, the device data 252 may further include respective device capacities, including, but not limited to, a mobile radio type, a mode of transportation of a respective mobile radio, bandwidth of a respective mobile radio, and the like.

As depicted, the memory further stores a master list 260 indicative of unusable channels 109 associated with respective locations (e.g. "Location 1", etc.), for example locations of the mobile radios 103 when a scan of unusable channels occurred, along with respective times (e.g. "Time 1", etc.) that a respective scan of unusable channels 109 occurred. Provisioning of the master list 260 will be described in more detail below. However, it is assumed in FIG. 2 that the master list 260 has been configured based on lists indicative of unusable channels 109 previously received from the mobile radios 103. For example, at a time "Time 1", at the "Location 1", the channels 109 "Channel 1", "Channel 2", and "Channel 4" were determined to be unusable. Furthermore, while present embodiments will be described with respect to lists indicative of unusable channels 109, including the master list 260 of unusable channels, lists indicative of unusable channels may alternatively include lists of channels 109 usable at a location; in some of these implementations, the lists may exclude channels 109 unusable at a location but, as the number of channels 109 are predefined, any channels 109 (e.g. of the predefined channels 109) excluded from such lists are understood to be unusable. Hence, any list and/or master list described herein as being indicative of unusable channels may include lists of usable channels and/or, lists of unusable channels.

The interface 224 is generally configured to communicate with the plurality of mobile radios 103 using the predefined channels 109 over the wireless links 104, including, but not limited to, WiFi links, radio links, cellphone links, and the like. In other words, the links 104 may include any suitable combination of wireless networks, though a portion of such wireless networks may include wired networks. Such wireless networks may include a vehicle area network, and the like.

The interface 224 may be at least partially implemented by, for example, one or more radios and/or connectors and/or network adaptors, configured to communicate wirelessly, with network architecture that is used to implement one or more of the channels 109 between the device 101 and the mobile radios 103 and/or a wireless network. In these embodiments, the interface 224 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 224 includes one or more local area network or personal area network transceivers operating in accordance with an IEEE 902.11 standard (e.g., 902.11a, 902.11b, 902.11g), or a Bluetooth™ transceiver which may be used to communicate with the mobile radios 103 (e.g. assuming that one or more of the mobile radios 103 are within range of such a local area network or personal area network transceiver). In some embodiments, the interface 224 is further configured to communicate "radio-to-radio" on some communication channels (e.g. in embodiments where the interface 224 includes a radio), while other communication channels are configured to use wireless network infrastructure.

However, in other embodiments, the interface 224 communicates with the one or more mobile radios 103 using other servers and/or communication devices, for example by communicating with the other servers and/or communication devices using, for example, packet-based and/or internet protocol communications, and the like, and the other servers and/or communication devices use radio communications to wirelessly communicate with the one or more mobile radios 103.

Furthermore, the interface 224 may be configured to communicate with the mobile radios 103 using trunking, and/or analog trunking, to control the mobile radios 103 to communicate over specific assigned channels 109. For example, a request to communicate over a channel (including, but not limited to, a "key-up" indication) may be received at the device 101 from a mobile radio 103 over a trunking channel, and the device 101 may responsively assign a channel 109 to the requesting mobile radio 103 by transmitting, over the interface 224, using the trunking channel, information identifying the at least one assigned channel 109 to a mobile radio 103 for use by the mobile radio 103. In other words, the interface 224 may be configured to communicate with the mobile radios 103 over the trunking channel to control the mobile radios 103 to use a particular channel 109 for communication.

The optional display device 226 comprises any suitable one of, or combination of, flat panel displays (e.g. LCD (liquid crystal display), plasma displays, OLED (organic light emitting diode) displays) and the like, as well as one or more optional touch screens (including capacitive touchscreens and/or resistive touchscreens). The optional input device 228 comprises any suitable one of, or combination of keyboards, pointing devices, touchpads, touchscreens, buttons, and the like. Furthermore, when present, one or more of the display device 226 and the input device 228 may be external to the device 101 and accessible to the device 101 via the interface 224; for example, the display device 226 and/or the input device 228 may be components of one or more operator terminals (not depicted) used by one or more operators (not depicted) in a computer aided dispatch center such as the dispatch center 102.

Furthermore, the controller 220, the memory 222 and the interface 224 may, together, be components of a base station and/or a trunking controller implemented at the device 101, which automatically and/or dynamically assigns channels 109 for use by the mobile radios 103.

In any event, it should be understood that a wide variety of configurations for the device 101 are within the scope of present embodiments.

Figure 3:
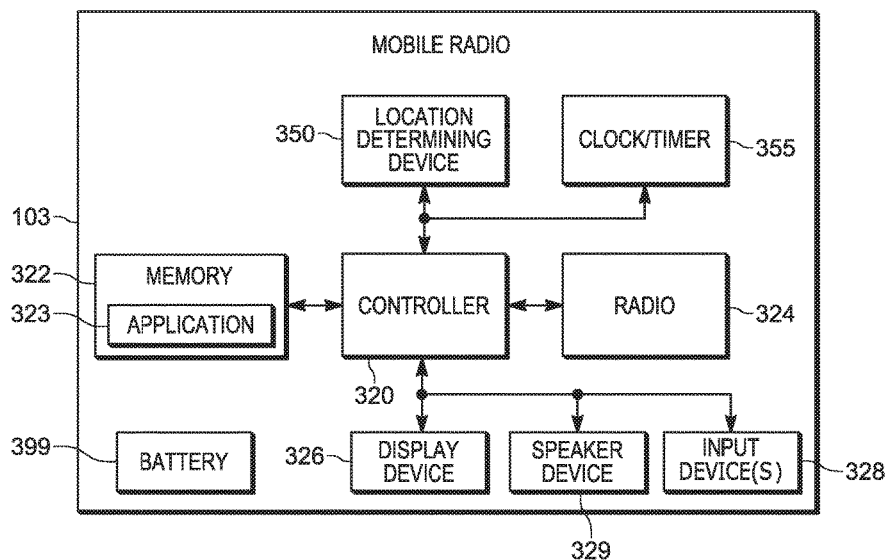
FIG. 3 depicts a block diagram of a mobile radio through which a responder is electronically dispatched in accordance with some embodiments.

Attention is next directed to FIG. 3 which depicts a block diagram of an example mobile radio 103. As depicted each mobile radio 103 comprises a controller 320, a memory 322 and a radio 324 (interchangeably referred to as the radio 324), as well as an optional display device 326 and at least one input device 328 and a speaker device 329. The controller 320, the memory 322 the radio 324, the display device 326 and the input device 328 are each respectively similar to the controller 220, the memory 222, the interface 224, the display device 226 and the input device 228 of the device 101, adapted, however, for the respective platform of the respective mobile radio 103. In particular, however, the radio 324 comprises a communication interface and/or transceiver configured to communicate over the channels 109.

As depicted, the mobile radio 103 further includes a location determining device 350, including, but not limited to, one or more of GPS device, a GLONASS device, a triangulation device, and the like. The mobile radio 103 may periodically determine its respective location using the location determining device 350 and transmit the respective location to the device 101 (e.g. along with a device identifier) for storage as location data 259.

As depicted, the mobile radio 103 further includes a clock 355 and/or timer, which may be configured to determine a current time and/or date, and may be further used by the controller 320 to determine when a given period of time has elapsed. While the clock 355 is depicted as separate from the controller 320, the clock 355 may alternatively be integral with the controller 320 (e.g. a clock and/or timer of processor, and the like).

As depicted, the mobile radio 103 further includes a battery 399, and the like, configured to power the components of the mobile radio 103.

As depicted, the memory 322 stores an application 323, that, when executed by the controller 320, enables the controller 320 to: control the radio 324 to scan the channels 109; generate a list indicative which of the channels 109 are unusable in the scan; and transmit the list to the device 101. For example, the controller 320 may determine that a channel 109 is unusable when a received signal strength indicator (RSI) is below a threshold value (e.g. about 20 dB above noise) and/or the controller 320 may determine that a channel 109 is unusable when a bit error rate (BER) is above a threshold value (e.g. about 5%), and the like, however any technique for determining whether a channel 109 is unusable is within the scope of present implementations. Transmission of a list indicative of unusable channels 109 may occur using one of the channels 109 that are usable and/or a trunking channel.

Furthermore, a scan of the channels 109, generation of a list indicative of the unusable channels 109, and transmission of the list to the device 101 may occur one or more of: periodically, upon request by the device 101 (e.g. over a trunking channel) and/or when the mobile radio 103 has travelled a given distance and/or when a trigger event occurs at the mobile radio 103.

Such a trigger event may include receiving, from an associated officer down detection device 114 and/or an associated holster detection device 116, an indication of an officer-down event and/or an unholstered-gun event. Alternatively, and/or in addition to, such a trigger event may include receiving a dispatch command, and the like, to an incident location (e.g. the location 108), and/or when the dispatch command includes an indication of the dispatch command being an emergency dispatch command.

Furthermore, such a trigger event can further include determining that a communication from the device 101 is indicative of an emergency event at the location 108, the communication including an indication of the location 108. However, in some implementations, the controller 220 controls the radio 324 to scan the channels 109 only when a current location of the device 101 (e.g. as determined using the location determining device 350) is within a threshold distance of the location 108 and/or when a travel time to the location 108 is within a threshold travel time. Such a travel time may be determined by communicating both the current location and the location 108 to a map server and/or a traffic server using the radio 324.

In some implementations, when the controller 320 executes the application 323, the controller 320 is further enabled to: transmit, with the list of the unusable channels 109, a current location to the device 101 (e.g. as determined by the location determining device 350).

In some implementations, when the controller 320 executes the application 323, the controller 320 is further enabled to: transmit, with the list of the unusable channels 109, to the device 101, a time (which may include a date) that a scan occurred (e.g. as determined by the clock 355 and/or a clock device of the controller 320).

In some implementations, when the controller 320 executes the application 323, the controller 320 is further enabled to: transmit, with the list of the unusable channels 109, using the radio 324 (e.g. over a trunking channel) to the device 101, the list marked as priority and/or is transmitted with an indication of priority. For example, the list of the unusable channels 109 may be marked as priority, and the like, when the list has been generated when a trigger event has occurred, as described above.

In some implementations, when the controller 320 executes the application 323, the controller 320 is further enabled to: receive, from the device 101, using the radio 324 (e.g. over a trunking channel), information identifying one or more assigned channel 109 that the mobile radio 103 is to use to communicate within the region 106, for example while assigned to the incident location 108 and/or when dispatched to the incident location 108.

Hence, the controller 320 may hence be generally configured to communicate with the device 101, and the like, to both receive dispatch commands and/or trunking information, and to provide the device 101 with lists indicative of unusable channels 109 The controller 320 may be further configured to communicate with the other mobile radios 103 being dispatched to the location 108, for example using one or more assigned channels 109. Such communications may occur radio-to-radio and/or via the device 101.

Figure 4:
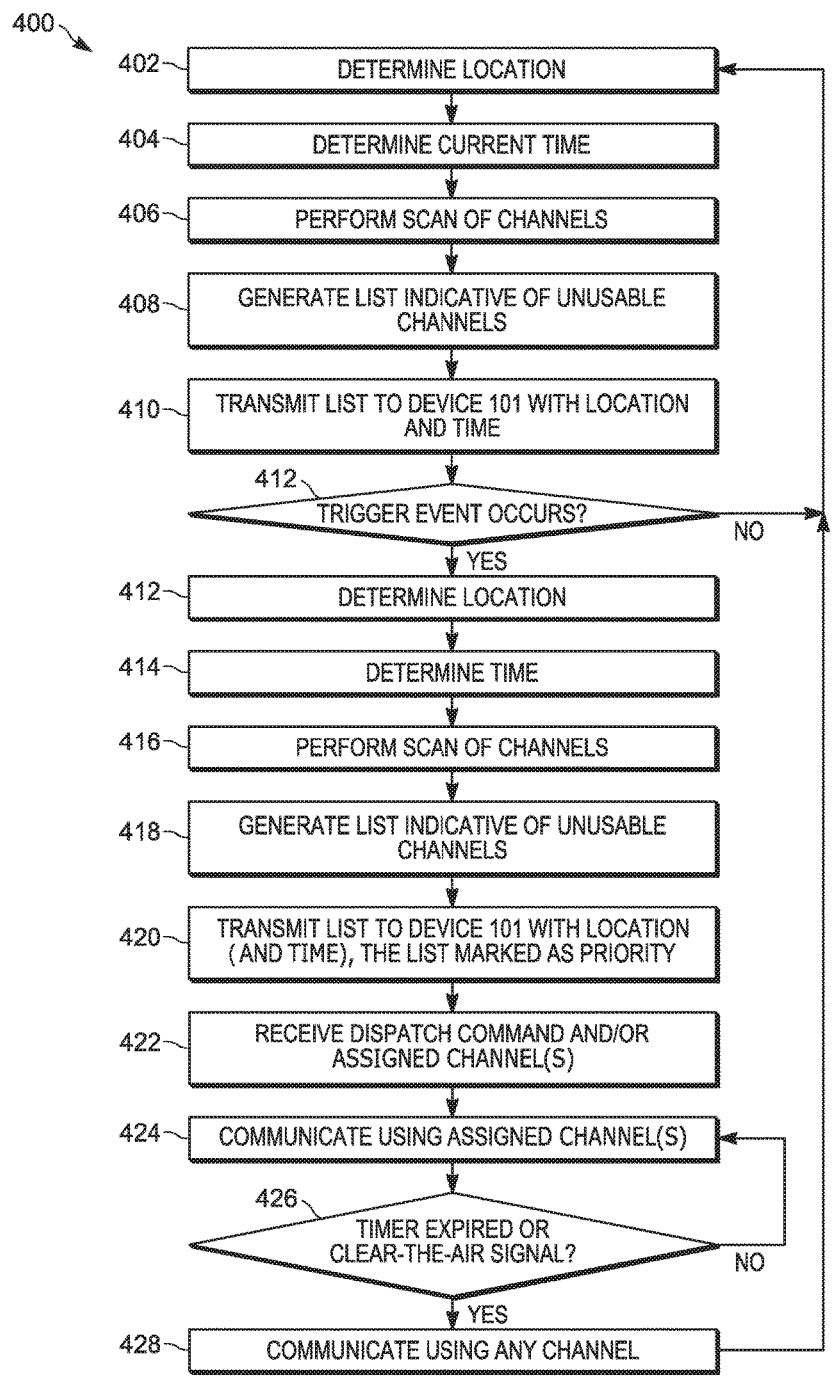
FIG. 4 is a flowchart of a method of channel scanning in accordance with some embodiments.

Attention is now directed to FIG. 4 which depicts a flowchart representative of a method 400 for channel scanning. In some embodiments, the operations of the method 400 of FIG. 4 correspond to machine readable instructions that are executed by, for example, the mobile radio 103 of FIG. 3 and/or by any of the mobile radios 103 of FIG. 1, and specifically by a controller 320 of a mobile radio 103. In the illustrated example, the instructions represented by the blocks of FIG. 4 are stored at the memory 322, for example, as the application 323. The method 400 of FIG. 4 is one way in which the mobile radio 103 and/or the controller 320 and/or the system 100 is configured. Furthermore, the following discussion of the method 400 of FIG. 4 will lead to a further understanding of the system 100 and the mobile radios 103, and its various components.

However, it is to be understood that the mobile radio 103 and/or the controller 320 and/or the method 400 and/or the system 100 may be varied, and need not work exactly as discussed herein in conjunction with each other, and that such variations are within the scope of present embodiments.

Furthermore, the method 400 of FIG. 4 need not be performed in the exact sequence as shown and likewise various blocks may be performed in parallel rather than in sequence. Accordingly, the elements of method 400 are referred to herein as "blocks" rather than "steps".

At a block 402, the controller 320 determines a location of the mobile radio 103, for example using the location determining device 350.

At an optional block 404, the controller 320 determines a current time, for example using the clock 355.

At a block 406, the controller 320 controls the radio 324 to perform a scan of the channels 109.

At a block 408, the controller 320 generates a list indicative of unusable channels 109 based, for example, on a respective RSSI of a channel 109 being below a threshold RS SI (and/or a respective BER of a channel being above a respective threshold BER).

At a block 410, the controller 320 transmits the list to the device 101. The list is generally transmitted with the location determined at the block 402 and optionally the time determined at the block 404.

At a block 412, the controller 320 monitors communications received on the radio 324 and/or the devices 114, 116, and the like, to determine whether a trigger event has occurred. When no trigger event has occurred (e.g. a "NO" decision at the block 412), the blocks 402-410 repeat one or more of: periodically (e.g. after a given period of time has elapsed); when the mobile radio 103 has travelled a given distance (e.g. as determined using the location determining device 350); when a request for a list is received from the device 101, and the like.

However, when a trigger event has occurred (e.g. a "YES" decision at the block 412), the controller implements the blocks 412, 414 (which may be optional), 416, 418 which are respectively similar to the blocks 402, 404, 406, 408.

At the block 420, in contrast to the block 410, the controller 320 transmits the list to the device 101 (e.g. with the location determined at the block 412 and optionally the time determined at the block 414), with the list marked as priority. Such a list marked as priority may cause the device 101 to implement a method for dynamic assignment of channels 109 as described below with respect to FIG. 5. Implementation of such a method may cause the device 101 to transmit a dispatch command and/or at least one assigned channel 109, and the like, to the mobile radio 103 implementing the method 400, which is received by the controller 320 at a block 422.

At a block 424, the controller 320 communicates using the at least one assigned channel 109; for example, the controller 320, using the at least one assigned channel 109, may communicate with the device 101 and/or other devices 103 that also received the dispatch command and/or at least one assigned channel 109.

At a block 426, the controller 320 determines whether a timer has expired (e.g. using the clock 355) and/or whether a "clear-the-air" signal has been transmitted and/or received. If not (e.g. a "NO" decision at the block 426) the controller 320 continues to communicate using the at least one assigned channel 109 at the block 424. However, when a timer has expired and/or when a "clear-the-air" signal has been transmitted and/or received (e.g. a "YES" decision at the block 426), at the block 428, the controller 320 communicates using any of the channels 109. The method 400 may then repeat.

Figure 5:
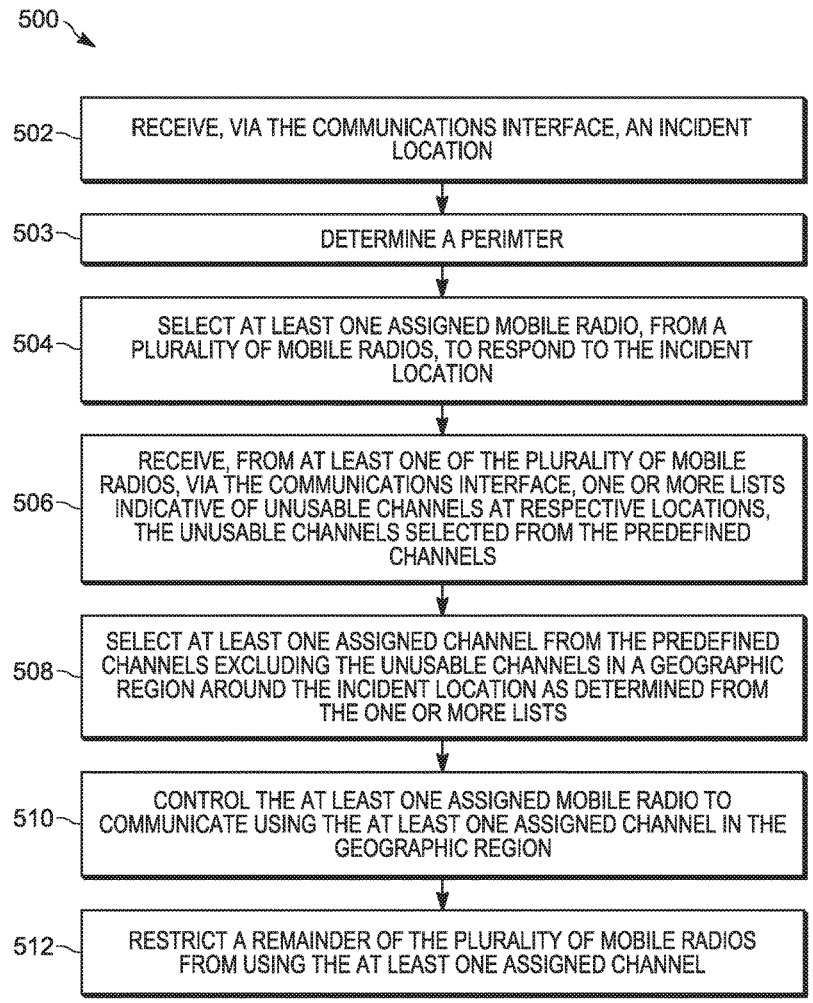
FIG. 5 is a flowchart of a method of dynamically assigning channels in accordance with some embodiments.

Attention is now directed to FIG. 5 which depicts a flowchart representative of a method 500 for dynamic channel assignment. In some embodiments, the operations of the method 500 of FIG. 5 correspond to machine readable instructions that are executed by, for example, the device 101 of FIG. 1, and specifically by the controller 220 of the device 101. In the illustrated example, the instructions represented by the blocks of FIG. 5 are stored at the memory 222, for example, as the application 223. The method 500 of FIG. 1 is one way in which the device 101 and/or the controller 220 and/or the system 100 is configured. Furthermore, the following discussion of the method 500 of FIG. 5 will lead to a further understanding of the system 100 and the device 101, and its various components.

However, it is to be understood that the device 101 and/or the controller 220 and/or the method 500 and/or the system 100 may be varied, and need not work exactly as discussed herein in conjunction with each other, and that such variations are within the scope of present embodiments.

Furthermore, the method 500 of FIG. 5 need not be performed in the exact sequence as shown and likewise various blocks may be performed in parallel rather than in sequence. Accordingly, the elements of method 500 are referred to herein as "blocks" rather than "steps".

At a block 502, the controller 220 receives, via the communications interface 224, an incident location 108, for example in an incident report 112, and the like. Alternatively, the location 108 may be received in a list marked as priority transmitted by a mobile radio 103 implementing the method 400, and specifically at the block 420.

At a block 503, the controller 220 determines a perimeter, for example as defined by the region 106 and/or based on a type of incident received in the report 112.

At a block 504, the controller 220 selects at least one assigned mobile radio 103, from the plurality of mobile radios 103, to respond to the incident location 108.

At a block 506, the controller 220 receives, from at least one of the plurality of mobile radios 103, via the communications interface 224, one or more lists indicative of unusable channels 109 at respective locations, the unusable channels 109 selected from the predefined channels 109.

At a block 508, the controller 220 selects at least one assigned channel 109 from the predefined channels 109 excluding the unusable channels 109 in a geographic region 106 around the incident location 108 as determined from the one or more lists.

At a block 510, the controller 220 controls the at least one assigned mobile radio 103 to communicate using the at least one assigned channel 109 in the geographic region 106.

At a block 512, the controller 220 restricts a remainder of the plurality of mobile radios 103 (e.g. other than the at least one assigned mobile radio 103) from using the at least one assigned channel 109, for example until an all-clear and/or clear-the-air signal is received.

Example embodiments of the method 400 and the method 500 will now be described with respect to FIG. 6 to FIG. 12.

Figure 6:
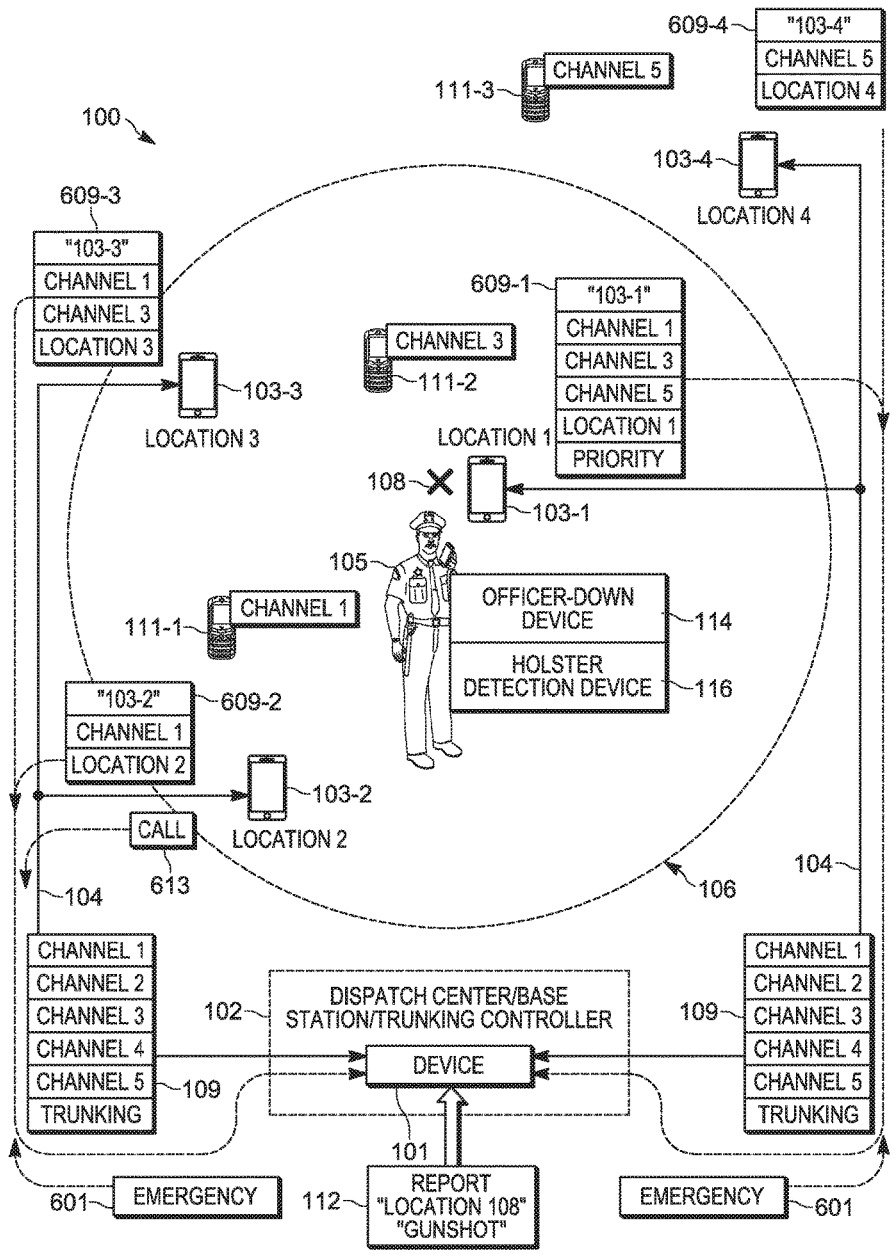
FIG. 6 depicts a base station and/or a dispatch device of the system of FIG. 1 receiving lists indicative of usable channels in accordance with some embodiments.
Figure 7:
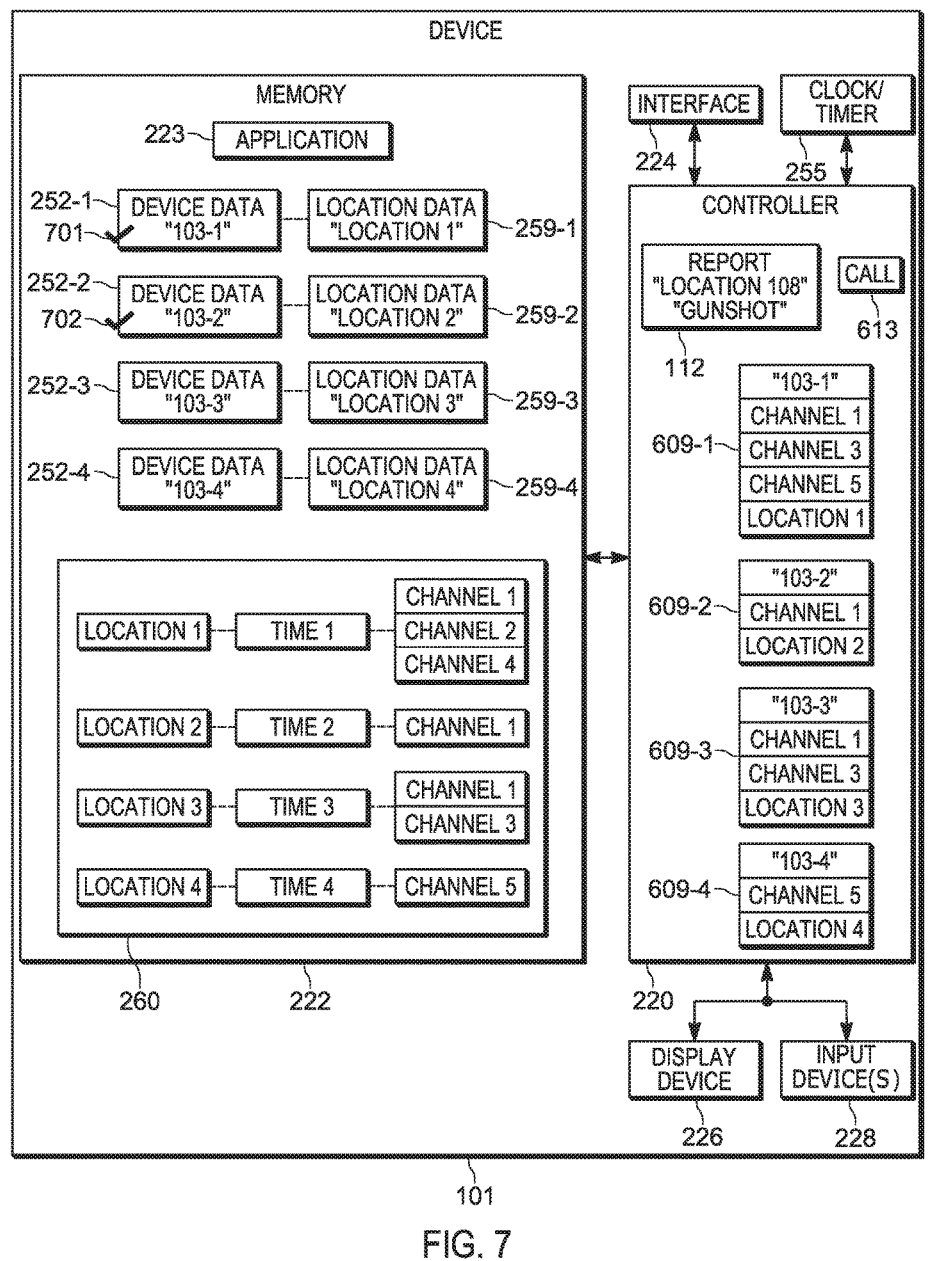
FIG. 7 depicts a device assigning mobile radios to respond to an incident location in accordance with some embodiments.

Attention is next directed to FIG. 6 and FIG. 7 which are respectively substantially similar to FIG. 1 and FIG. 2, with like elements having like numbers. In FIG. 1, the device 101 and/or the controller 220 is receiving (e.g. at the block 502), an incident location for example, in the report 112. As depicted in FIG. 6, it is further assumed that the controller 220 has determined a perimeter at the block 503 by determining the region 106.

As also depicted in FIG. 6, the controller 220, in response to receiving the report 112, optionally issues an emergency call 601 to all the mobile radios 103, for example as broadcast over all channels 109 and/or using a given talkgroup. The emergency call 601 may alternatively comprise a generic dispatch command requesting that at least a portion of the mobile radios 103 respond to the incident location 108.

As also depicted in FIG. 6, each of the mobile radios 103 are transmitting (e.g. at the block 410 and/or the block 420 of the method 400) respective lists 609-1, 609-2, 609-3, 609-4 (interchangeably referred to hereafter, collectively, as the lists 609 and, generically, as a list 609), the lists 609 being indicative of unusable channels 109 at their respective locations. As depicted, each of the lists 609 are transmitted with a respective location (e.g. "Location 1", etc.), but not a current time, though alternatively, one or more of the lists 609 may be transmitted with a current time and/or a time at which a scan of unusable channels occurred to generate a respective list 609. Each of the lists 609 are further transmitted with a respective identifier (e.g. "103-1" etc.) of a respective mobile radio 103 transmitting the list 609.

Hence, it is assumed in FIG. 6 that each of the mobile radios 103 have implemented the blocks 402-408 and/or the blocks 412-418.

In particular, the mobile radio 103-1 includes an indication of priority ("e.g. the text "Priority") in the list 609-1, hence the mobile radio 103-1 has, in particular, implemented the block 420. The list 609-1 may be transmitted in response to receiving the emergency call 601 and/or in response to receiving a dispatch command and/or in response to a trigger event at the mobile radio 103-1 (e.g. as determined at the block 412).

As also depicted in FIG. 6, the mobile radio 103-2 responds to the emergency call 601 and/or generic dispatch command with a call 613 indicating that the mobile radio 103-2 will respond to the incident location 108. The call 613 may be initiated by a responder operating the mobile radio 103-2.

Furthermore, with reference to FIG. 7, the controller 220 selects (e.g. at the block 504) at least one assigned mobile radio 103-1 to respond to the incident location 108 (e.g. as based on a geographic location of the mobile radio 103-1) based, for example, on the location "Location 108" received in the report 112 (and/or in a list 609, such as the list 609-1 marked as priority).

The selection of the assigned mobile radio 103-1 may hence be based on a proximity of the mobile radio 103-1 to the location 108 and/or a distance of the mobile radio 103-1 at the "Location 1" to the location 108, and the like, and or the mobile radio 103-1 being within the region 106 (and/or the determined perimeter). However, the selection of the assigned mobile radio 103-1 may alternatively be based on capabilities of the mobile radios 103 (which may be stored in the device data 252). However, the selection of the assigned mobile radio 103-1 may alternatively be based on receipt of a list 609 marked as priority, for example, as received from the radio 103-1. As depicted in FIG. 7, the selection of the mobile radio 103-1 is schematically indicated by a checkmark 701 adjacent respective device data 252-1.

However, such an assignment may also be based on the call 613, and the like, of the mobile radio 103-2 to the device 101 in response to the emergency call 601. Hence as also depicted in FIG. 7, the controller 320 has further selected the radio 103-2 to respond to the incident location 108, as schematically indicated by a checkmark 702 adjacent respective device data 252-1.

As also depicted in FIG. 7, the controller 220 has received (e.g. at the block 506), the lists 609.

Figure 8:
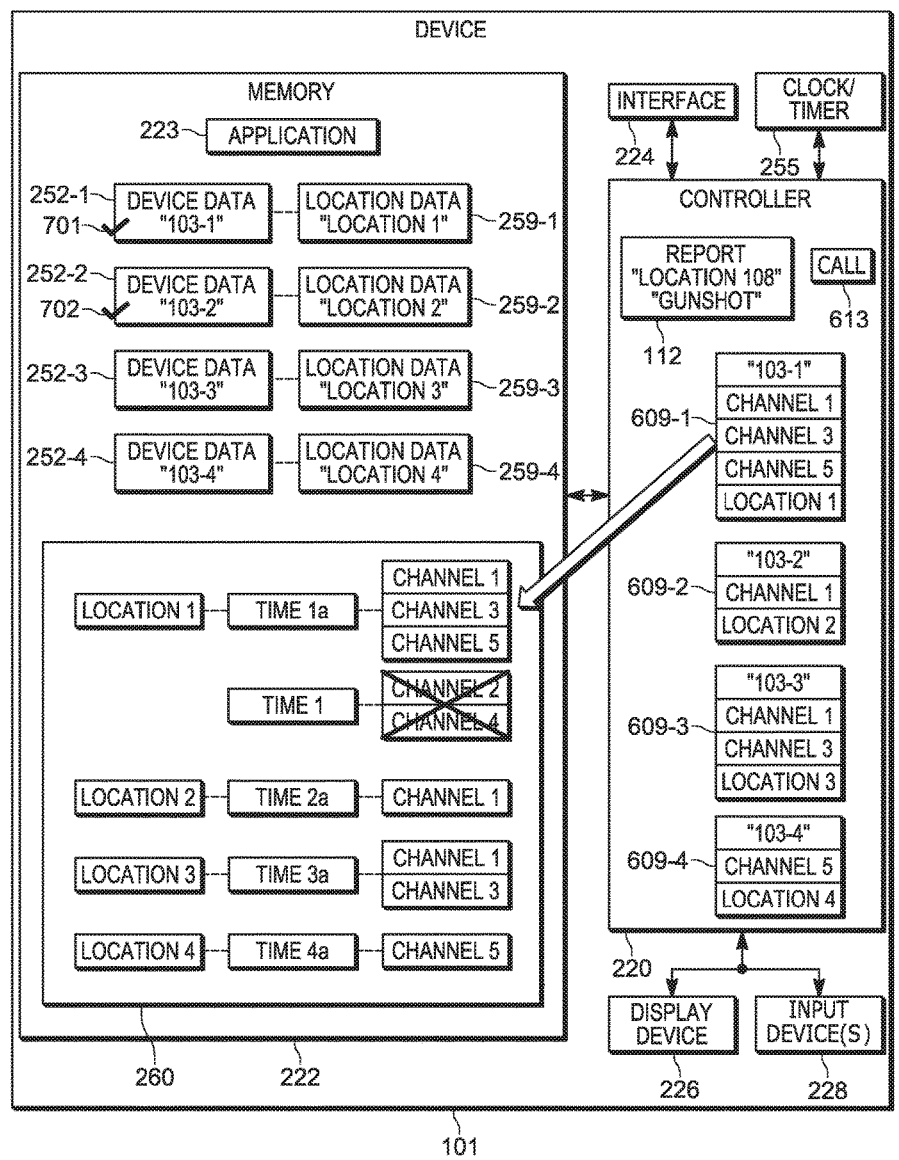
FIG. 8 depicts a device updating a master list indicative of unusable channels in accordance with some embodiments.

Attention is next directed to FIG. 8, which is substantially similar to FIG. 7, with like elements having like numbers. In FIG. 8, the controller 220 is depicted maintaining the master list 260 by: adding an indication of a respective unusable channel 109 at a respective location to the master list 260 when the respective unusable channel 109 is not in the master list 260; and removing an indication of an unusable channel 109 at the respective location from the master list 260, when the unusable channel 109 in the master list 260 is not included in the list of the respective unusable channels 109 at the respective location.

For example, as depicted in FIG. 8, as at the "Location 1" in the list 609-1, the channels 1, 3, 5 are listed as unusable, but the channels 3, 5 are not in the master list 260 in association with the "Location 1", the channels 3, 5 are added to the master list 260 in association with the "Location 1". Furthermore, as the channels 2, 4 which were previously unusable at the "Location 1" are not in the list 609-1, and hence usable at the "Location 1", the channels 2, 4 are removed from the master list 260 in association with the "Location 1".

As the unusable channels 109 indicated in the lists 609-2, 609-3, 609-4 are the same as those already in the master list 260, the unusable channels 109 stored in association with "Location 2", "Location 3", and "Location 4" do not change and/or the unusable channels 109 indicated in the lists 609-2, 609-3, 609-4 are discarded.

Put another way, the controller 220 may be further configured to: maintain a master list 260 indicative of the unusable channels 109 associated with the respective locations; and when a list 609 and/or a further list 1009 indicative of respective unusable channels 109 at a respective location is received, update the master list 260 by: adding an indication of an unusable channel 109 at the respective location to the master list 260 when the indication of the unusable channel is not in the master list 260; and removing the indication of the unusable channel from the master list 260, when the indication of the unusable channel in the master list 260 is not included in the further list 1009.

However, in some embodiments, the locations received in the lists 609 may not exactly align with the locations stored in the master list 260. In some of these embodiments, the controller 220 may store the new locations and the unusable channels 109 received in the lists 609 in the master list 260.

However, in other embodiments, maintaining the master list 260 may be based on a threshold distance from the locations stored in the master list 260. For example, assuming that the "Location 1" received in the list 609-1 does not align exactly with the "Location 1" stored in the master list 260, and further assuming that the "Location 1" received in the list 609-1 is within a threshold distance from the "Location 1" stored in the in the master list 260, the controller 220 may, update the unusable channels 109 stored in association with the "Location 1" using the list 609-1.

Such a threshold distance may be configured at the application 223 and may be any suitable threshold distance over which interference on a channel 109 may occur, for example, about 500 meters, though any threshold distance is within the scope of present implementations.

For example, the controller 220 may be further configured to: add or remove an indication of an unusable channel 109 from the master list 260, in association with a given location, when the respective location received of the unusable channels 109, received in a further list 1009, is within a threshold distance of a given location stored in the master list.

As further depicted in FIG. 8, the times stored in association with each location in the master list 260 are updated to a current time (e.g. "Time 1a", etc.). The current time may be determined from the clock 255 (e.g. the current time being a time at which a respective list 609 was received) and/or a current time received in respective list 609).

Furthermore, while each of the channels 2, 4 are depicted as being deleted (e.g. via the "X" through each of "Channel 2" and "Channel 4") in FIG. 8 from association with the "Location 1", the channels 2, 4 may alternatively continue to be stored in association with a time "Time 1" at which the channels 2, 4 were determined to be unusable.

Figure 9:
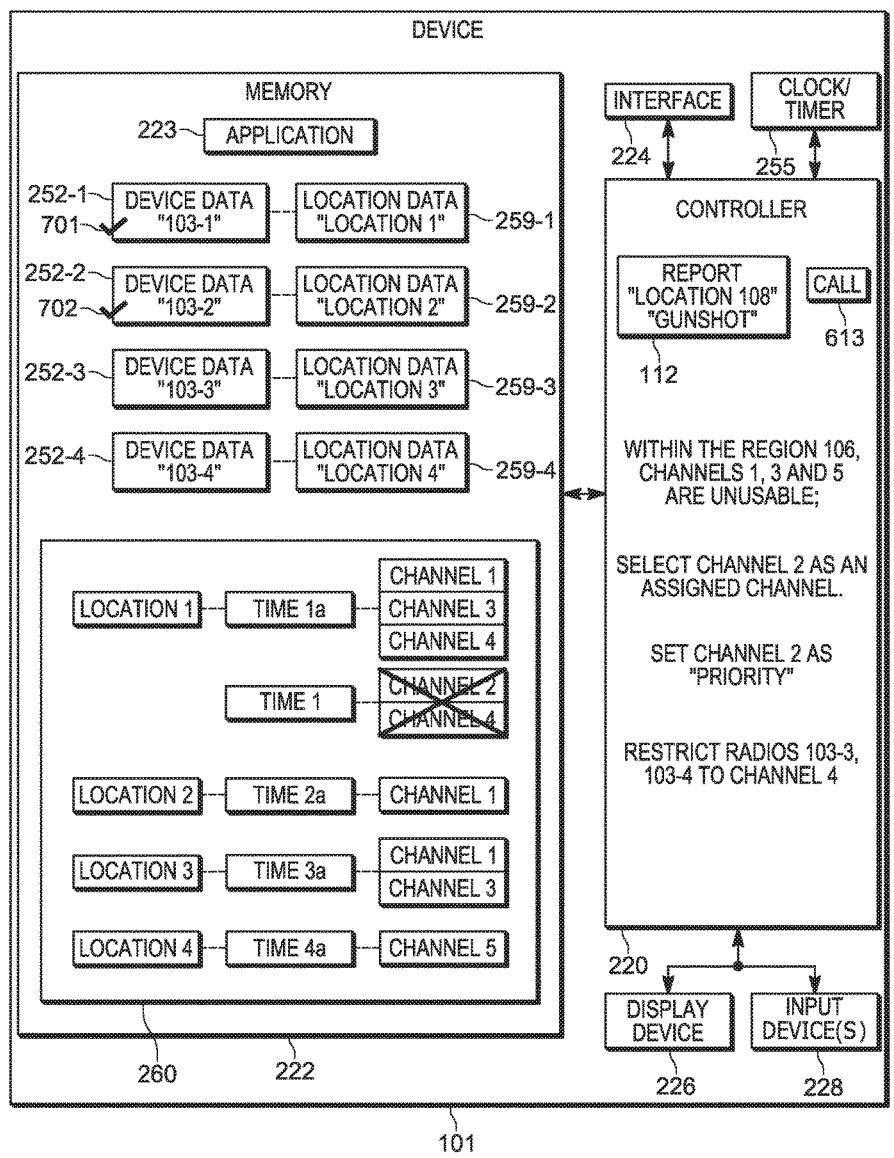
FIG. 9 depicts a device assigning channels for use by assigned mobile radios responding to an incident location in accordance with some embodiments.

Attention is next directed to FIG. 9, which is substantially similar to FIG. 8, with like elements having like numbers. However, in FIG. 9, the controller 220 is implementing the block 508 to select at least one assigned channel 109 from the predefined channels 109 excluding the unusable channels 109 in a geographic region 106 around the incident location 108 as determined from the one or more lists 609.

For example, as depicted, the channels 1, 3 and 5 have been determined to be unusable in the region 106 (e.g. as indicated at each of the locations "Location 1", "Location 2", and "Location 3"). Hence, the controller 220 selects an assigned channel 109 from usable channels 2 and 4. As depicted, channel 2 is selected. Furthermore, in the example of FIG. 9, channel 2 is set as a "Priority" channel, which restricts the mobile radios 103-3, 103-4 (e.g. not selected to respond to the location 108) from using channel 2; in these embodiments, a channel 109 selected at the block 508 as an assigned channel may alternatively be referred to as a priority channel. Furthermore, while only one channel 109 is selected as an assigned (and/or priority) channel 109, more than one channel may be selected as an assigned channel 109 though generally at least one usable channel 109, when available, may remain unassigned (e.g. not set as priority) for use by other mobile radios 103 in the region 106.

Hence, in the region 106, the assigned mobile radios 103-1, 103-2 will be controlled to communicate using the assigned channel 109 (i.e. channel 2). Furthermore, assuming that the mobile radios 103-1, 103-2 belong to a same talkgroup, the usable channel 2 may be selected as an assigned channel 109 for the same talkgroup. Indeed, the usable channel 2 may be set as a priority channel, for example until an "all-clear" and/or "clear-the-air" signal is received", and other talkgroups may be restricted from using the usable channel 2. However, the other talkgroups will not be restricted from using other usable channels 109.

For example, assuming the mobile radios 103-3. 103-4 belong to a talkgroup different from the talkgroup of the mobile radios 103-1, 103-2, the mobile radios 103-3, 103-4 may be restricted from using channel 2, but not usable channel 4. Indeed, as depicted, the mobile radios 103-3, 103-4 are restricted to using usable channel 4, regardless of their location relative to the region 106. In other words, in some embodiments, for example when the system 100 comprises a trunking system, as the channel 2 has been marked as priority, only mobile radios 103 belonging to the same talkgroup as the mobile radios 103-1, 103-2 may use channel 2. However, when one or more of the mobile radios 103-3, 103-4 are in the same talkgroup as the mobile radios 103-1, 103-2, one or more of the mobile radios 103-3, 103-4 may use channel 2.

However, in some embodiments, the restrictions placed on the mobile radios 103-3, 103-4 may be based on their location relative to the region 106, regardless of their being in a same talkgroup as the mobile radios 103-1, 103-2. For example, in these embodiments, the mobile radio 103-3 at the Location 3, in the region 106 may be restricted from using the assigned channel 109 (e.g. channel 2), until the mobile radio 103-3 leaves the region 106 (and/or until the channel 2 is no assigned and/or set as priority). In other words, the mobile radio 103-3 will be restricted to using the remaining usable channel 4 (e.g. assuming that the other channels 1, 3, 5 are unusable) based on the location of the mobile radio 103-3. Similarly, in some embodiments, no restrictions may be placed on channels 109 used by the mobile radio 103-4 as the mobile radio 103-4 is outside the region 106.

The at least one assigned channel 109 (e.g. channel 2), may be further selected according to a current time. For example, as depicted in FIG. 9, assuming that indications of the channels 2, 4 are maintained in the master list 260 as being unusable at a "Time 1", and assuming that the current time does not correspond to the "Time 1", the channels 2, 4 are determined to be usable at the current time. Hence, put another way, the controller 220 may be further configured to (e.g. at the block 508): select the at least one assigned channel 109 from the predefined channels 109 excluding the unusable channels 109 in the geographic region 106 and according to a current time.

Figure 10:
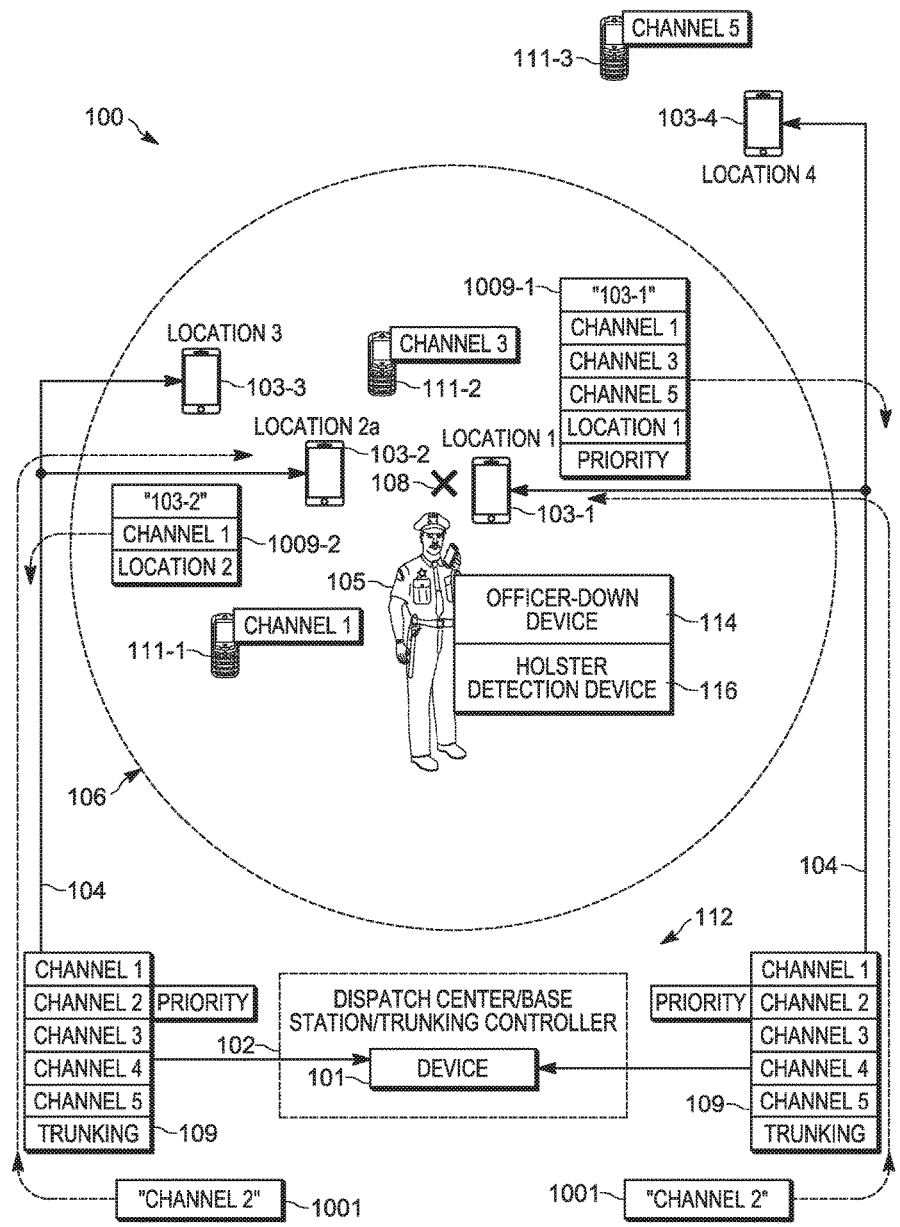
FIG. 10 depicts a device controlling assigned mobile radios to use assigned channels in accordance with some embodiments.

Attention is next directed to FIG. 10 which depicts the device 101 controlling the assigned mobile radios 103-1, 103-2 to communicate over the assigned channel 109 (e.g. the channel 2), by transmitting, to each of the assigned mobile radios 103-1, 103-2, for example over the trunking channel, an indication 1001 of the assigned channel 109 (e.g. as depicted "Channel 2", which is furthermore marked as "Priority"). The indication 1001 may alternatively comprise a dispatch command. Furthermore, the indication 1001 may be received at the assigned mobile radios 103-1, 103-2 at the block 422 and cause the assigned mobile radios 103-1, 103-2 to communicate using the assigned channel 109 (e.g. at the block 424) until a timer expires and/or a clear-the-air signal is transmitted and/or received at the block 426.

The indications 1001 may be transmitted once, or any time a "key-up" signal is received from an assigned radio 103-1, 103-2, for example over the trunking channel.

As also depicted in FIG. 10, the mobile radio 103-2 has been transported to a "Location 2a", proximal the location 108.

As also depicted in FIG. 10, in response to receiving the indication 1001, one or more of the assigned mobile radios 103-1, 103-2 may alternatively again transmit a respective list 1009-1, 1009-2 indicative of unusable channels 109.

Alternatively, the respective list 1009-1, 1009-2 indicative of unusable channels 109 may be transmitted when the mobile radios 103-1, 103-2 arrive at the location 108.

Indeed, in some implementations, the initial assignment of a radio 103, and selection of at least one assigned channels 109 may be based on data stored at the memory 222 (e.g. the device data 252, the location data 259 and the master list 260) as it exists prior to receiving any lists 609, 1009, and assigned channels 109 may be updated based on further lists 1009 received at the device 101 in response to transmitting a dispatch command. In other words, the indications 1001 may include a dispatch command, and the respective lists 1009 may be received in response to transmitting the dispatch command.

Furthermore, the assigned channels 109 may be updated as various channels 109 become unusable or usable while the assigned mobile radios 103-1, 103-2 are responding to the incident at the incident location 108.

Figure 11:
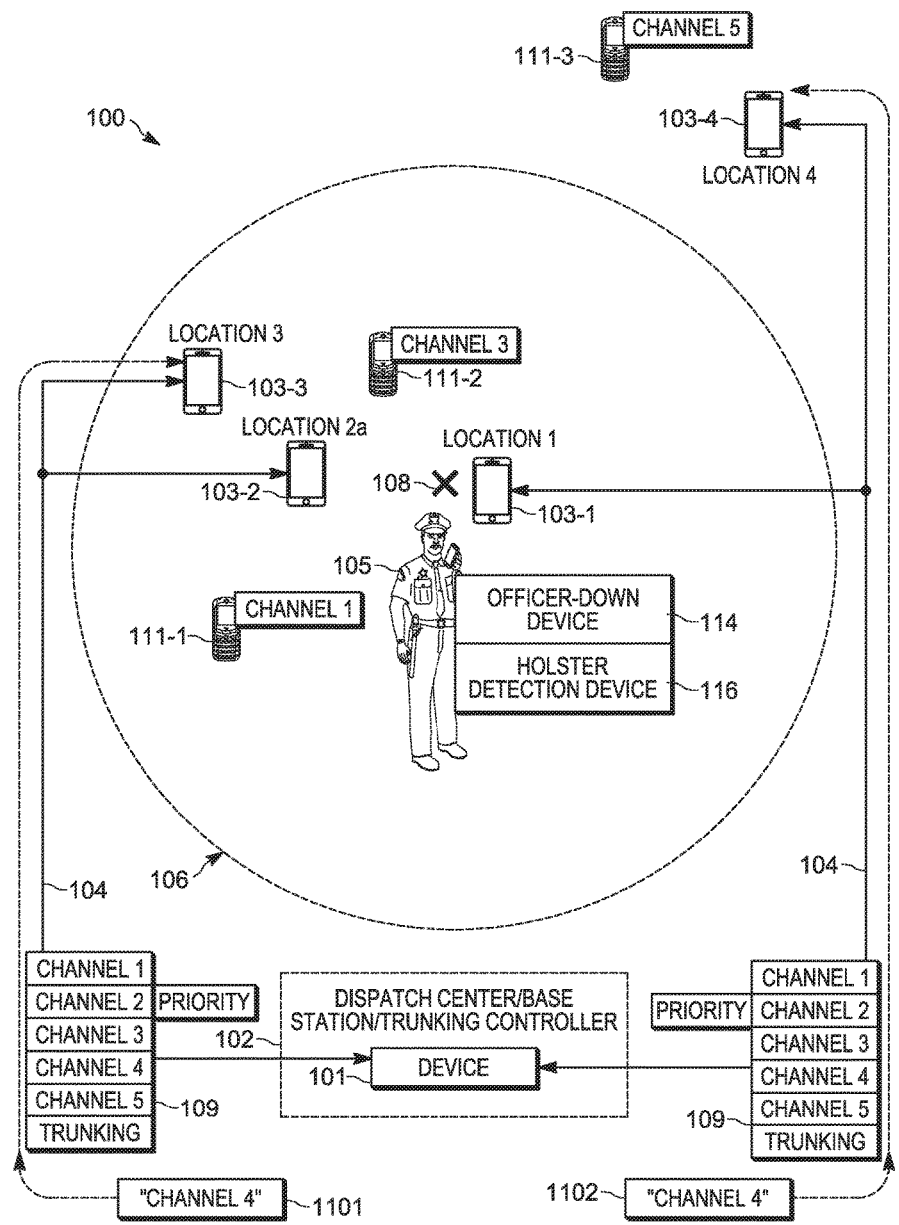
FIG. 11 depicts a device restricting other mobile radios in a region of the location incident from using the assigned channels, for example until an all-clear and/or clear-the-air signal is received, in accordance with some embodiments.

Attention is next directed to FIG. 11 which depicts the device 101 implementing the block 512. In particular, the device 101 is transmitting a respective indication 1101, 1102 to each of the mobile radios 103-3, 103-4 which restricts the mobile radios 103-3, 103-4 from using the assigned channel 109 (e.g. channel 2), regardless of whether the mobile radios 103-3, 103-4 are in the region 106 or not. For example, the indication 1101 may be transmitted over the trunking channel and include an indication "channel 4" of a useable channel 109 which the mobile radio 103-3 may use for communication within the region 106; similarly, the indication 1102 may be transmitted over the trunking channel and include an indication "channel 4" of a useable channel 109 which the mobile radio 103-4 may use for communication outside the region 106. The useable channel 109 "channel 4" is different from the at least one assigned channel 109 (e.g. channel 2) that has been selected for use by the assigned mobile radios 103-1, 103-2.

Alternatively, as described above, the restrictions placed on channels 109 used by the mobile radios 103-3, 103-4 may depend on whether they belong to a same talkgroup as the mobile radios 103-1, 103-2; when so, no restrictions may be placed on their channel use, other than to assign usable channels for use by the mobile 103-3, 103-4.

Alternatively, as described above, the restrictions placed on channels 109 used by the mobile radios 103-3, 103-4 may depend on their location regardless of whether they belong to a same talkgroup as the mobile radios 103-1, 103-2; for example, when located inside the region 106, the mobile radios 103-3, 103-4 may be restricted from using the one or more usable channels 109 assigned to the mobile radios 103-1, 103-2; and when located outside the region 106, the mobile radios 103-3, 103-4 may not be restricted from using the one or more usable channels 109 assigned to the mobile radios 103-1, 103-2.

Hence, in some embodiments, in the region 106 of the incident location 108, at least one priority channel 109 may be selected for use by the assigned mobile radios 103 in the region 106, that no other mobile radio 103 inside the region 106 of the incident location 108 may use. Indeed, in some of these embodiments, no other mobile radio 103 outside the region 106 of the incident location 108 may use at least one priority channel 109. Hence, for example, in another example, presuming there are five useable channels 109 in the system 100 (rather than the two described above), a first subset of the five useable channels 109 may be selected (e.g. by the device 101) as priority channels for use by mobile radios 103 assigned to respond to the incident location 108, while a second subset of the five useable channels 109 may be selected (e.g. by the device 101) as channels for use by mobile radios 103 not assigned to respond to the incident location 108. Indeed, in some embodiments, at least one useable channel 109 is always available for use by mobile radios 103 not assigned to respond to the incident location 108; in embodiments where there is only one useable channel 109, no restrictions of use are placed on the only one useable channel 109.

Figure 12:
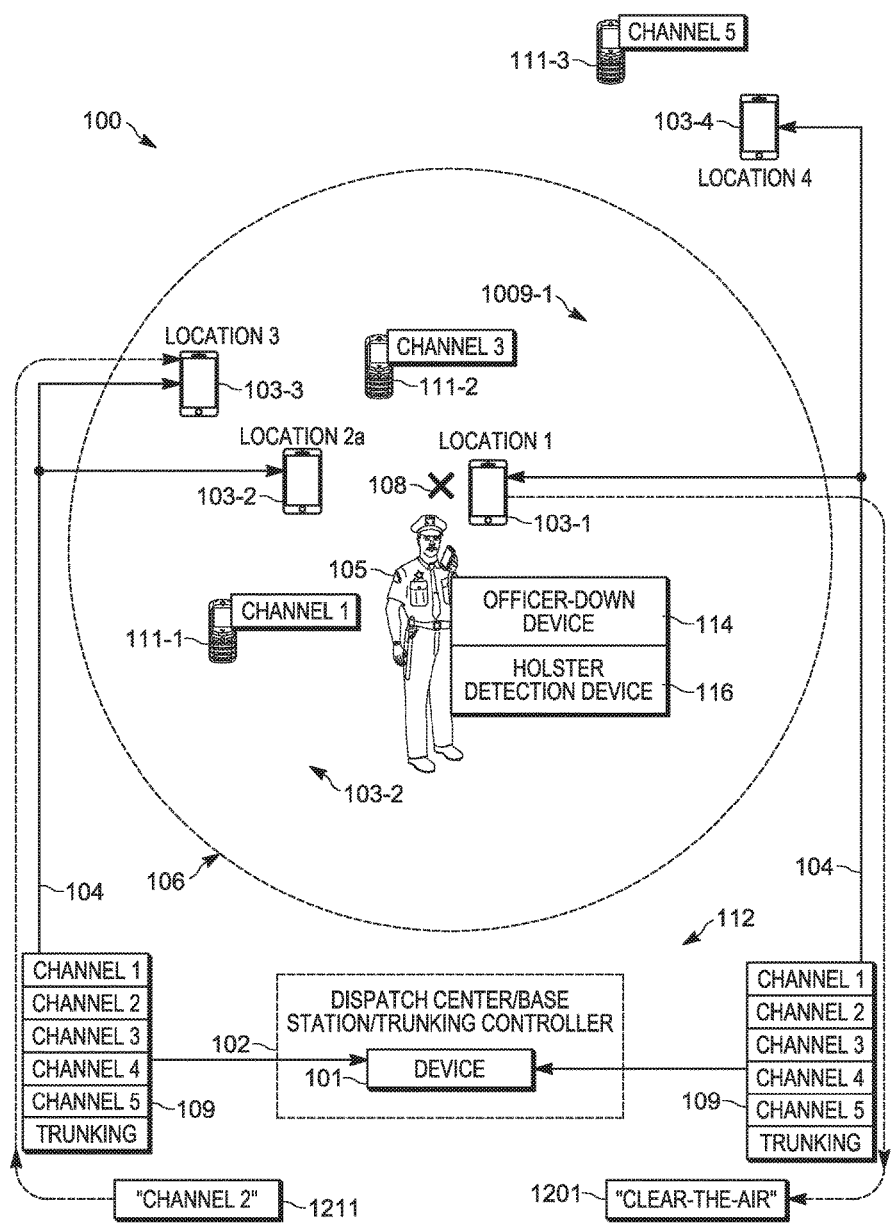
FIG. 12 depicts a device opening the assigned channels in accordance with some embodiments.

Attention is next directed to FIG. 12 which is substantially similar to FIG. 11, with like elements having like numbers. However, in FIG. 12, the mobile radio 103-1 is transmitting a "clear-the-air" signal 1201 to the device 101. The "clear-the-air" signal 1201 (which may also be referred to as an "all-clear" signal, and like) may be transmitted in response to the responder 105 operating the mobile radio 103-1 to transmit the "clear-the-air" signal 1201, for example when the incident at the location 108 is finished, and the like.

Receipt of "clear-the-air" signal 1201 causes the device 101 to open the at least one assigned channel 109 and hence, for example, the mobile radio 103-3 may be controlled to use the now opened channel 2, for example via an indication 1211. Hence, the channel 2 is no longer set as "Priority".

The transmission of the "clear-the-air" signal 1201 may further cause the radio 103-1 to implement the block 428 (e.g. a "YES" decision occurs at the block 426") to use any channel 109 for communication, though the implementation of the block 428 may occur via receiving trunking commands on the trunking channel. Similarly, the mobile radio 103-2 may receive a "clear-the-air" signal from the device 101 to implement the block 428, and/or implement the block 428 upon receipt of trunking commands on the trunking channel.

Alternatively, the assigned channel 109 may be opened after a timer expires, for example after an hour, and/or a time period associated with an incident type. Hence, when no "clear-the-air" signal is received (e.g. the responder 105 forgets to transmit the "clear-the-air" signal 1201), the assigned channel 109 may be automatically opened.

Hence, provided herein is a communication system 100 comprising: a plurality of mobile radios 103; and a base station (e.g. the device 101), the base station assigning one or more channels for use by one or more of the plurality of mobile radios 103 in a geographic region around an incident location using one or more lists indicative of unusable channels in the geographic region, the one or more lists received by the plurality of mobile radios 103, the one or more channels assigned for use excluding the unusable channels in the geographic region. Such a system may enable clear communication for mobile radios 103 dispatched to an incident location, by preventing the mobile radios 103 to at least temporarily be prevented from using channels over which interference may occur.

Furthermore, the scanning of unusable channels may continue at the mobile radios 103 assigned to respond to an incident location to ensure that, when any channels that were previously usable, become unusable, the assigned mobile radios 103 may be restricted from using the newly unusable channels.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of at least two items X, Y, and Z (e.g., XYZ, XY, YZ, ZZ, and the like). Similar logic can be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communication device comprising:
   a communications interface configured to communicate with a plurality of mobile radios using predefined wireless channels associated with first responders, each of the plurality of mobile radios associated with respective first responders; and
   a controller configured to:
      receive, via the communications interface, an incident location;
      select at least one assigned mobile radio associated with a respective first responder, from the plurality of mobile radios, to respond to the incident location;
      receive, from at least one of the plurality of mobile radios, via the communications interface, one or more lists of unusable wireless channels at respective locations as determined by the at least one of the plurality of mobile radios at the respective locations, the unusable wireless channels selected from the predefined wireless channels associated with the first responders, wherein an unusable wireless channel comprises a wireless channel of the predefined wireless channels, which causes problems when a mobile radio responding to an incident at the incident location attempts to communicate using the wireless channel, and wherein at least one list of the unusable channels, of the one or more lists of the unusable channels, received from at least one of the plurality of mobile radios, includes an indication of priority;
      in response to receiving the indication of priority included in the at least one list of the unusable channels:
         select at least one assigned wireless channel from the predefined wireless channels excluding the unusable wireless channels in a geographic region around the incident location as determined from the one or more lists; and
         control the at least one assigned mobile radio to communicate using the at least one assigned wireless channel in the geographic region,
      wherein the one or more lists indicative of the unusable wireless channels at the respective locations include respective times at which a given wireless channel was unusable,
   the controller further configured to:
      add or remove the indication of the unusable wireless channel from a master list, in association with a given location, when the respective location is within a threshold distance of a given location stored in the master list; and
      select the at least one assigned wireless channel from the predefined channels excluding the unusable wireless channels in the geographic region and according to a current time.

2. The communication device of claim 1, wherein the controller is further configured to: select the at least one assigned wireless channel from the predefined wireless channels excluding the unusable wireless channels in the geographic region and according to a current time.

3. The communication device of claim 1, wherein the controller is further configured to: restrict a remainder of the plurality of mobile radios in the geographic region from using the at least one assigned wireless channel.

4. The communication device of claim 1, wherein the at least one assigned mobile radio is part of a talkgroup that uses the at least one assigned wireless channel to communicate, and the controller is further configured to: restrict a remainder of the plurality of mobile radios in a different talkgroup from the least one assigned mobile radio from using the at least one assigned wireless channel.

5. The communication device of claim 1, wherein the controller is further configured to: transmit a dispatch command to the at least one assigned mobile radio to respond to the incident location, wherein receipt of the one or more lists of the unusable wireless channels is received from the at least one assigned mobile radio in response to transmitting the dispatch command.

6. The communication device of claim 1, wherein the controller is further configured to:
   maintain the master list of the unusable wireless channels associated with the respective locations; and
   when a further list of respective unusable wireless channels at a respective location is received, update the master list by:
      adding an indication of an unusable wireless channel at the respective location to the master list when the indication of the unusable wireless channel is not in the master list; and
      removing the indication of the unusable wireless channel from the master list, when the indication of the unusable wireless channel in the list is not included in the further list.

7. The communication device of claim 1, wherein the controller is further configured to: select the at least one assigned mobile radio, from the plurality of mobile radios, to respond to the incident location, based on one or more of: respective geographic locations of the plurality of mobile radios; and calls received from one or more of the plurality of radios.

8. A method comprising:
   receiving, at a controller of a communication device, via a communications interface of the communication device, an incident location, the communications interface configured to communicate with a plurality of mobile radios using predefined wireless channels associated with first responders, each of the plurality of mobile radios associated with respective first responders;
   selecting, at the controller, at least one assigned mobile radio associated with a respective first responder, from the plurality of mobile radios, to respond to the incident location;
   receiving, at the controller, from at least one of the plurality of mobile radios, via the communications interface, one or more lists of unusable wireless channels at respective locations as determined by the at least one of the plurality of mobile radios at the respective locations, the unusable wireless channels selected from the predefined wireless channels associated with the first responders, wherein an unusable wireless channel comprises a wireless channel of the predefined wireless channels, which causes problems when a mobile radio responding to an incident at the incident location attempts to communicate using the wireless channel, and
   wherein at least one list of the unusable channels, of the one or more lists of the unusable channels received from at least one of the plurality of mobile radios, includes an indication of priority;
      in response to receiving the indication of priority included in the at least one list of the unusable channels:
         selecting, at the controller, at least one assigned wireless channel from the predefined wireless channels excluding the unusable wireless channels in a geographic region around the incident location as determined from the one or more lists; and controlling, using the controller, the at least one assigned mobile radio to communicate using the at least one assigned wireless channel in the geographic region, wherein the one or more lists indicative of the unusable wireless channels at the respective locations include respective times at which a given wireless channel was unusable, the controller configured to:

add or remove the indication of the unusable wireless channel from a master list, in association with a given location, when the respective location is within a threshold distance of a given location stored in the master list; and select the at least one assigned wireless channel from the predefined channels excluding the unusable wireless channels in the geographic region and according to a current time.

9. The method of claim 8, further comprising: selecting, at the controller, the at least one assigned wireless channel from the predefined wireless channels excluding the unusable wireless channels in the geographic region and according to a current time.

10. The method of claim 8, further comprising: restricting, at the controller, a remainder of the plurality of mobile radios in the geographic region from using the at least one assigned wireless channel.

11. The method of claim 8, wherein the at least one assigned mobile radio is part of a talkgroup that uses the at least one assigned wireless channel to communicate, and the method further comprises: restricting, at the controller, a remainder of the plurality of mobile radios in a different talkgroup from the least one assigned mobile radio from using the at least one assigned wireless channel.

12. The method of claim 8, further comprising: transmitting, from the controller, using the communication interface, a dispatch command to the at least one assigned mobile radio to respond to the incident location, wherein receipt of the one or more lists of the unusable wireless channels is received from the at least one assigned mobile radio in response to transmitting the dispatch command.

13. The method of claim 8, further comprising:

maintaining, at the controller, the master list of the unusable wireless channels associated with the respective locations; and when a further list of respective unusable wireless channels at a respective location is received, updating, at the controller, the master list by:

adding an indication of an unusable wireless channel at the respective location to the master list when the indication of the unusable wireless channel is not in the master list; and removing the indication of the unusable wireless channel from the master list, when the indication of the unusable wireless channel in the master list is not included in the further list.

14. The method of claim 8, further comprising: selecting, at the controller, the at least one assigned mobile radio, from the plurality of mobile radios, to respond to the incident location, based on one or more of: respective geographic locations of the plurality of mobile radios; and calls received from one or more of the plurality of radios.

15. A communication system, comprising:

a plurality of mobile radios associated with respective first responders: and a base station, the base station assigning one or more wireless channels associated with first responders, for use by one or more of the plurality of mobile radios in a geographic region around an incident location using one or more lists of unusable wireless channels in the geographic region, wherein an unusable wireless channel comprises a wireless channel, associated with the first responders, which causes problems when a mobile radio responding to an incident at the incident location attempts to communicate using the wireless channel, the one or more lists of the unusable channels received from the plurality of mobile radios, the unusable wireless channels determined by the at least one of the plurality of mobile radios in the geographic region, wherein at least one list of the unusable channels, of the one or more lists of the unusable channels, received at the base station includes an indication of priority, the one or more wireless channels assigned for use excluding the unusable wireless channels in the geographic region, the one or more wireless channels assigned by the base station in response to receiving the indication of priority in the at least one list, wherein the one or more lists indicative of the unusable wireless channels at the respective locations include respective times at which a given wireless channel was unusable, the base station configured to:

add or remove the indication of the unusable wireless channel from a master list, in association with a given location, when the respective location is within a threshold distance of a given location stored in the master list; and select the at least one assigned wireless channel from the predefined channels excluding the unusable wireless channels in the geographic region and according to a current time.

\* \* \* \* \*